(12) United States Patent
Gintis

(10) Patent No.: US 9,264,340 B2
(45) Date of Patent: Feb. 16, 2016

(54) METHODS, SYSTEMS, AND COMPUTER READABLE MEDIA FOR MISDIRECTED PACKET DRILL DOWN AND NEGATIVE PACKET CAPTURE AT A NETWORK TEST DEVICE

(71) Applicant: Ixia, Calabasas, CA (US)

(72) Inventor: Noah Gintis, Westlake Village, CA (US)

(73) Assignee: Ixia, Calabasas, CA (US)

( * ) Notice: Subject to any disclaimer, the term of this patent is extended or adjusted under 35 U.S.C. 154(b) by 98 days.

(21) Appl. No.: 13/832,137

(22) Filed: Mar. 15, 2013

(65) Prior Publication Data

US 2014/0269337 A1    Sep. 18, 2014

(51) Int. Cl.
*H04L 12/26* (2006.01)

(52) U.S. Cl.
CPC ............... *H04L 43/50* (2013.01); *H04L 43/026* (2013.01); *H04L 43/028* (2013.01); *H04L 43/045* (2013.01)

(58) Field of Classification Search
CPC ...................................................... H04L 43/50
See application file for complete search history.

(56) References Cited

U.S. PATENT DOCUMENTS

| | | | |
|---|---|---|---|
| 5,343,463 | A | 8/1994 | van Tetering et al. |
| 5,477,531 | A | 12/1995 | McKee et al. |
| 5,600,632 | A | 2/1997 | Schulman |
| 5,742,760 | A | 4/1998 | Picazo, Jr. et al. |
| 5,787,253 | A | 7/1998 | McCreery et al. |
| 5,850,386 | A | 12/1998 | Anderson et al. |
| 5,878,032 | A | 3/1999 | Mirek et al. |
| 5,982,753 | A | 11/1999 | Pendleton et al. |
| 6,028,847 | A | 2/2000 | Beanland |
| 6,041,053 | A | 3/2000 | Douceur et al. |
| 6,065,053 | A | 5/2000 | Nouri et al. |
| 6,088,777 | A | 7/2000 | Sorber |
| 6,172,989 | B1 | 1/2001 | Yanagihara et al. |
| 6,252,891 | B1 | 6/2001 | Perches |
| 6,295,557 | B1 | 9/2001 | Foss et al. |

(Continued)

FOREIGN PATENT DOCUMENTS

| | | |
|---|---|---|
| JP | 2012-113371 A | 6/2012 |
| WO | WO 2014/149573 A1 | 9/2014 |

OTHER PUBLICATIONS

Torrents, "Open Source Traffic Analyzer," 2010, KTH Information Communication Technology.*

(Continued)

*Primary Examiner* — Jae Y Lee
(74) *Attorney, Agent, or Firm* — Jenkins, Wilson, Taylor & Hunt, P.A.

(57) ABSTRACT

Methods, systems, and computer readable media for misdirected packet drill down and negative packet capture at a network test device are disclosed. One exemplary method includes, at a network test device, receiving and storing, in the network test device, expected receive port information regarding a plurality of test packets. The method further includes transmitting the test packets to a device under test. The method further includes receiving at least some of the test packets from the device under test. The method further includes using the expected receive port information and the received test packets to identify misdirected test packets. The method further includes, for each of the packets identified as misdirected, determining a port of the network test device at which the packet should have been received and outputting an indication of the port of the network test device at which the packet should have been received.

26 Claims, 4 Drawing Sheets

(56) References Cited

U.S. PATENT DOCUMENTS

| | | | |
|---|---|---|---|
| 6,360,332 | B1 | 3/2002 | Weinberg et al. |
| 6,389,532 | B1 | 5/2002 | Gupta et al. |
| 6,446,121 | B1 | 9/2002 | Shah et al. |
| 6,545,979 | B1 | 4/2003 | Poulin |
| 6,601,098 | B1 | 7/2003 | Case et al. |
| 6,717,917 | B1 | 4/2004 | Weissberger et al. |
| 6,728,929 | B1 | 4/2004 | Luong |
| 6,789,100 | B2 | 9/2004 | Nemirovsky et al. |
| 6,820,034 | B2 | 11/2004 | Hanes et al. |
| 6,823,219 | B2 | 11/2004 | Lee et al. |
| 6,888,818 | B1 | 5/2005 | Gubbi |
| 6,910,061 | B2 | 6/2005 | Hu et al. |
| 6,950,405 | B2 | 9/2005 | Van Gerrevink |
| 7,007,089 | B2 | 2/2006 | Freedman |
| 7,035,223 | B1 | 4/2006 | Burchfiel et al. |
| 7,187,683 | B1 | 3/2007 | Sandoval et al. |
| 7,406,089 | B1 | 7/2008 | Rahim et al. |
| 7,443,870 | B2 | 10/2008 | Zioulas et al. |
| 7,489,706 | B2 | 2/2009 | Hatley et al. |
| 7,561,559 | B2 | 7/2009 | Hannel et al. |
| 7,594,159 | B2 | 9/2009 | Fujikami et al. |
| 7,643,431 | B2 | 1/2010 | Pepper |
| 7,826,377 | B2 | 11/2010 | Pepper |
| 7,826,381 | B1 | 11/2010 | Kastuar et al. |
| 8,248,926 | B2 | 8/2012 | Bockwoldt et al. |
| 8,310,942 | B2 | 11/2012 | Gintis et al. |
| 8,391,157 | B2 | 3/2013 | Ginsberg et al. |
| 8,582,466 | B2 | 11/2013 | Gintis et al. |
| 9,094,336 | B2 | 7/2015 | Gintis |
| 2001/0016867 | A1 | 8/2001 | Hu et al. |
| 2002/0183969 | A1 | 12/2002 | Hanes et al. |
| 2003/0033025 | A1 | 2/2003 | Lee et al. |
| 2004/0052259 | A1 | 3/2004 | Garcia et al. |
| 2004/0252686 | A1 | 12/2004 | Hooper et al. |
| 2005/0068891 | A1* | 3/2005 | Arsikere et al. ............ 370/232 |
| 2005/0086336 | A1 | 4/2005 | Haber |
| 2005/0286564 | A1 | 12/2005 | Hatley et al. |
| 2006/0088060 | A1 | 4/2006 | Fujikami et al. |
| 2006/0153078 | A1 | 7/2006 | Yasui |
| 2007/0115833 | A1 | 5/2007 | Pepper et al. |
| 2007/0291654 | A1 | 12/2007 | Pepper |
| 2008/0112332 | A1 | 5/2008 | Pepper |
| 2008/0181123 | A1 | 7/2008 | Huang et al. |
| 2008/0198754 | A1 | 8/2008 | Savoor et al. |
| 2009/0147671 | A1 | 6/2009 | Jaworski et al. |
| 2009/0161559 | A1 | 6/2009 | Bielig et al. |
| 2009/0175180 | A1 | 7/2009 | Yang et al. |
| 2009/0310491 | A1 | 12/2009 | Ginsberg et al. |
| 2010/0034100 | A1* | 2/2010 | Beyers ......................... 370/250 |
| 2010/0036939 | A1 | 2/2010 | Yang et al. |
| 2010/0095160 | A1 | 4/2010 | Dickens et al. |
| 2011/0069620 | A1* | 3/2011 | Gintis et al. ................. 370/250 |
| 2011/0069626 | A1 | 3/2011 | Sun et al. |
| 2011/0279138 | A1 | 11/2011 | Mutnury et al. |
| 2011/0280137 | A1 | 11/2011 | Bockwoldt et al. |
| 2012/0051234 | A1 | 3/2012 | Gintis et al. |
| 2013/0064125 | A1 | 3/2013 | Gintis et al. |
| 2013/0111535 | A1 | 5/2013 | Howe et al. |
| 2013/0329572 | A1 | 12/2013 | Gintis |
| 2014/0269347 | A1 | 9/2014 | Gintis |

OTHER PUBLICATIONS

Ixia, "Border Gateway Protocol (BGP) Conformance and Performance Testing Sample Test Plans," 2004, Ixia.*

Non-Final Office Action for U.S. Appl. No. 13/847,477 (Sep. 23, 2014).

Notification of Transmittal of the International Search Report and the Written Opinion of the International Searching Authority, or the Declaration for International Application No. PCT/US2014/019690 (Jun. 17, 2014).

Notice of Allowance and Fee(s) Due for U.S. Appl. No. 13/672,335 (Sep. 12, 2013).

Notice of Allowance and Fee(s) Due for U.S. Appl. No. 12/870,729 (Aug. 31, 2012).

Non-Final Office Action for U.S. Appl. No. 12/870,729 (Jul. 2, 2012).

Extended European Search Report for European Application No. 11008066.0 (Feb. 10, 2012).

Sadasivan et al., "Architecture for IP Flow Information Export," Network Working Group, RFC 5470, pp. 1-31 (Mar. 2009).

"IxExplorer User's Guide," Revision 2.1.0, Ixia, pp. 1-384 (Nov. 1, 1999).

Brownlee et al., "Traffic Flow Measurement: Architecture," Network Working Group, RFC 2722, pp. 1-49 (Oct. 1999).

"The Ixia 200 Traffic Generator and Analyzer," Product Description, Ixia, pp. 1-2 (Copyright 1997-1999).

"Load Modules—Multilayer Gigabit Ethernet for LM1000LX, LM1000SX, LM1000GBIC, & LM1000T," Product Specification Sheet, Ixia, pp. 1-2 (Publication Date Unknown).

"Ixia 200 Chassis," Product Description, Ixia, p. 1 (Publication Date Unknown).

Extended European Search Report for European Application No. 14002802.8 (Feb. 26, 2015).

Notice of Allowance and Fee(s) Due for U.S. Appl. No. 13/847,477 (Feb. 23, 2015).

Non-Final Office Action for U.S. Appl. No. 13/965,037 (Apr. 24, 2015).

* cited by examiner

MISDIRECTED PACKETS

| Source IP | Dest. IP | PGID | Expected Rcv Port | Actual Rcv Port |
|---|---|---|---|---|
| 196.192.0.1 | 128.154.0.1 | 0x0000C | 1 | 5 |
| 196.192.0.1 | 128.154.100.1 | 0x04300 | 2 | 4 |
| 196.192.0.1 | 128.154.200.1 | 0xB0001 | 3 | 3 |
| 196.192.0.1 | 128.154.300.1 | 0xFFFFB | 4 | 2 |

*FIG. 3*

NEGATIVE CAPTURE DATA

| TRANSMIT TIME | Source IP | Dest. IP | Protocol | Info | Expected Rcv Port |
|---|---|---|---|---|---|
| 366 11.7672290 | 196.192.0.1 | 128.154.0.1 | SNMP | Get - response | 5 |
| 366 11.7672296 | 196.192.0.1 | 128.154.100.1 | HTTP | Get- request | 4 |
| 366 11.7672300 | 196.192.0.1 | 128.154.200.1 | HTTP | Get | 3 |
| 366 11.7672305 | 196.192.0.1 | 128.154.300.1 | TCP | 4 | 2 |

*FIG. 4*

METHODS, SYSTEMS, AND COMPUTER READABLE MEDIA FOR MISDIRECTED PACKET DRILL DOWN AND NEGATIVE PACKET CAPTURE AT A NETWORK TEST DEVICE

TECHNICAL FIELD

The subject matter described herein testing network devices. More particularly, the subject matter described herein relates to methods, systems, and computer readable media for misdirected packet drill down and negative packet capture at a network test device.

BACKGROUND

Network test devices test the functionality of network devices, such as routers, switches, firewalls, and network address translators, by sending test packets to the network devices and monitoring the responses. For example, in order to test whether the routing tables of a router are properly configured, a network test device may generate packets, send the packets to the router, and monitor one or more output ports of the router to determine whether the packets are routed to the proper destinations. In a load testing scenario, the network test device may send packets to the router at a high data rate to see how the router's performance is affected by increased traffic loads.

In these and other test scenarios, it is desirable for the network test device to detect lost and misdirected packets. Misdirected test packets are test packets that are transmitted to the device under test that are received by the network test device at a port other than the expected receive port of the device under test. Lost packets are test packets that are transmitted to the device under test but that are not returned to the network test device. Packets may be lost or misdirected for a variety of reasons, including misconfiguration of the device under test, misconfiguration of the test setup, hardware or software defects in the device under test, etc. For both lost and misdirected packets, it is desirable to provide the test system operator with as much information as possible so that the operator can determine the cause of lost and misdirected packets.

Accordingly, in light of these difficulties, a need exists for improved methods, systems, and computer readable media for misdirected packet drill down and negative packet capture at a network test device.

SUMMARY

Methods, systems, and computer readable media for misdirected packet drill down and negative packet capture at a network test device are disclosed. One exemplary method includes, at a network test device, receiving and storing, in the network test device, expected receive port information regarding a plurality of test packets. The method further includes transmitting the test packets to a device under test. The method further includes receiving at least some of the test packets from the device under test. The method further includes using the expected receive port information and the received test packets to identify misdirected test packets. The method further includes, for each of the packets identified as misdirected, determining a port of the network test device at which the packet should have been received and outputting an indication of the port of the network test device at which the packet should have been received.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which:

FIG. 3 is a diagram of misdirected packet information that may be presented to a user by a network device test system according to an embodiment of the subject matter described herein; and FIG. 4 is a diagram of negative packet capture information that may be presented to a user by a network device test system according to an embodiment of the subject matter described herein.

DETAILED DESCRIPTION

Figure 1:
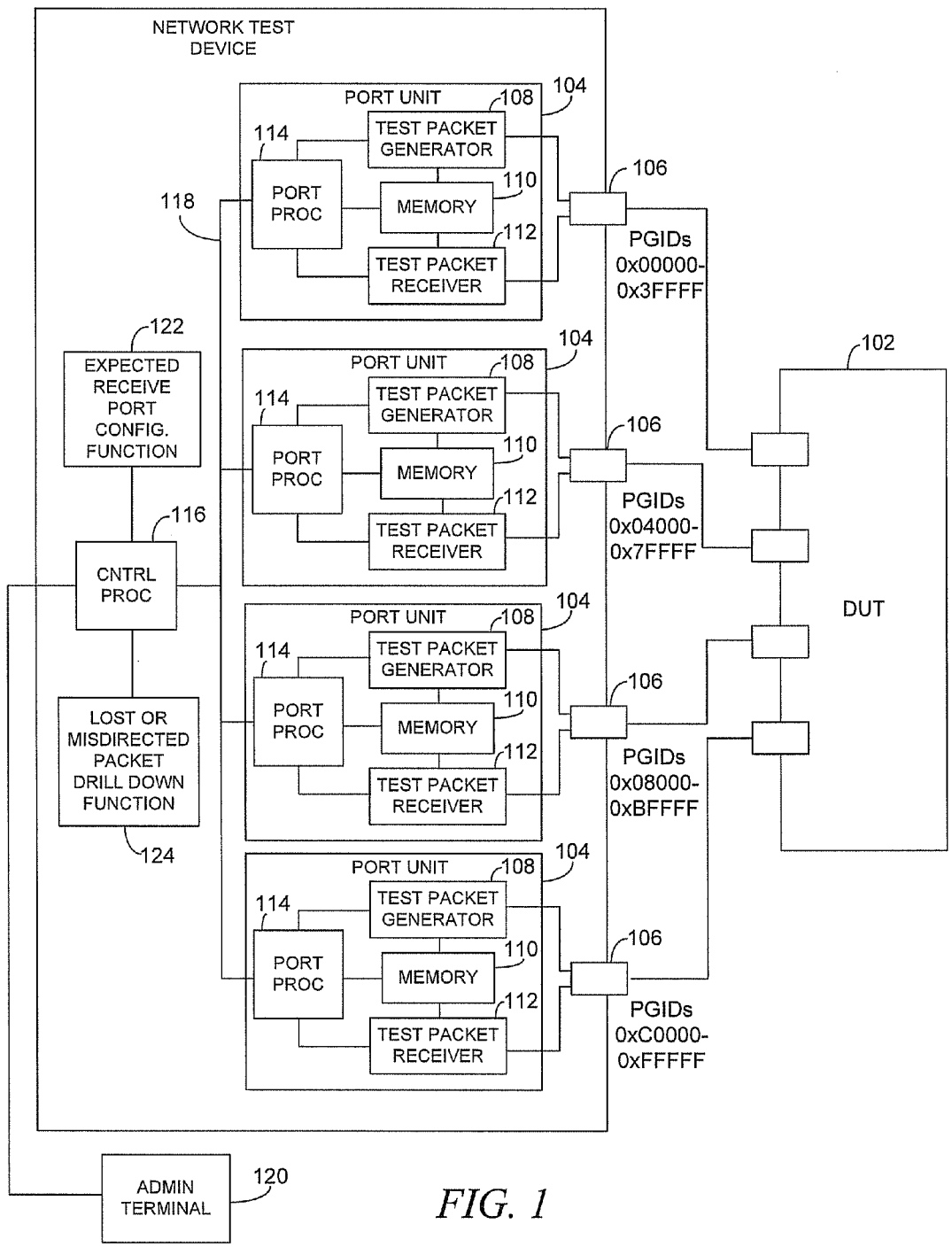
FIG. 1 is a block diagram of a system for misdirected packet drill down and negative packet capture at a network test device according to an embodiment of the subject matter described herein.

Methods, systems, and computer readable media for misdirected packet drill down and negative packet capture at a network test device are disclosed. FIG. 1 is a block diagram of a system for misdirected packet drill down and negative packet capture at a network test device according to an embodiment of the subject matter described herein. Referring to FIG. 1, the system includes a network test device 100 configured to generate test packets and transmit the test packets to a device under test 102. Device under test 102 may be any suitable network device that receives and processes or forwards packets. For example, device under test 102 may be a router, a switch, a firewall, or a network address translator.

In the illustrated example, network test device 100 includes a plurality of port units 104 that transmit packets to device under test 102 and receive packets from device under test 102 via ports 106. Each port unit 104 may be implemented as all or part of a printed circuit board mounted in a chassis. In the illustrated example, each port unit 104 includes a test packet generator 108, memory 110, a test packet receiver 112, and a port processor 114. Test packet generator 108 of each port unit generates test packets to be transmitted to device under test 102. Test packet receiver 112 receives packets from device under test 102 and generates statistics for the received packets. Memory 110 stores both configuration information for test packet generator 108 and test packet receiver 112 and also stores the generated statistics and any other information needed or collected by port unit 104. Port processor 114 controls the overall operation of each port unit 104. In addition, each port processor 114 may communicate with a control processor 116 over a backplane 118. Control processor 116 may control the overall operation of network test device 100. Control processor 116 may also control communications between admin terminal 120 and port processors 114. Admin terminal 120 may be a general purpose computer through which a test system operator configures network test device 100 and views output generated by network test device 100.

Network test device 100 further includes an expected receive port configuration function 122 and a lost or misdirected packet drill down function 124. Expected receive port configuration function 122 may perform operations that enable a user to configure each port unit 108 with information regarding the expected receive port for each transmitted packet. In one exemplary implementation, expected receive port configuration function 122 allows the user to configure, for each port unit, packet group identifier values (PGIDs) to be inserted in each packet and PGIDs that are expected to be received by each port unit 104. A PGID is an identifier for a packet group. The packet group is any plurality of packets for which network statistics are generated. In one implementation, the PGID is a 20-bit value stored in the packet payload. However, any number of bits that corresponds to addresses and available memory space of port units 104 may be used without departing from the scope of the subject matter described herein.

In one exemplary implementation, each port unit 104 may support 20-bit PGID values. That is, in hexadecimal, the complete range of PGID values supported by port units 104 is 0x00000-0xFFFFF. In a simplified example, it can be assumed that ranges of PGID values are divided equally between port units 104. In such an example, a first port unit 104 may support PGIDs ranging from 0x00000-0x3FFFF. A second port unit 104 may support PGID values 0x40000-0x7FFFF. A third port unit 104 may support PGID values 0x80000-0xBFFFF. A fourth port until 104 may support PGID values ranging from 0xC0000-0xFFFFF. These ranges are illustrated in FIG. 1.

Although ranges of PGID values are assigned to each port unit 104 in the example illustrated in FIG. 1, it is understood that more complex PGID assignment schemes may be implemented without departing from the scope of the subject matter described herein. For example, for multicast packets, the same PGID values may be assigned to multiple ports—i.e., to each port on which the multicast packets are expected to be received. Thus, port units 104 may be assigned overlapping PGID values and PGID values that do not correspond to sequential ranges.

Thus, when a packet is transmitted by one of port units 104 to device under test 102, the packet may be returned by device under test 102 to the same port 106, to a different port 106 from which the packet was transmitted, or the packet may be lost. If the test packet is received by network test device 100, upon receipt of the test packet, test packet receiver 112 will compare the PGID value in the packet to the range of PGID values associated with its respective port. If the PGID value is in range, test packet receiver 112 will classify the packet as a correctly received packet. If the PGID value is out of range, test packet receiver 112 will classify the packet as a misdirected packet.

In the example illustrated in FIG. 1, lost or misdirected drill down function 124 determines and displays information for each misdirected packet, in addition to the fact that a misdirected packet was received at a particular port. For example, for each misdirected packet, test packet receiver 112 may store the packet in memory 110. Lost or misdirected packet drill down function 124 may periodically retrieve misdirected packets from memories 110. For each misdirected packet, lost or misdirected packet drill down function 124 may display the port on which the packet was received and also the port on which the misdirected packet should have been received. This information will allow the test system operator to see what should have happened during the test.

In addition to identifying misdirected packets, lost or misdirected packet drill down function 124 identifies lost packets and displays lost packets to the user via a capture interface. A capture interface is a graphical interface that displays information regarding received or captured packets to a user. Examples of packet fields that may be displayed in the packet capture interface will be provided below. However, rather than displaying these fields for received or captured packets, lost or misdirected packet drill down function may display these fields for lost packets.

To identify lost packets, lost or misdirected packet drill down function 124 may keep a record of each packet transmitted by each test packet generator 108 in a given test. Such records may be kept in memory 110 resident on each port unit 104 or in a memory separate from port units 104 and accessible by lost or misdirected packet drill down function 124. Lost or misdirected packet drill down function 124 may periodically access memories 110 to determine which test packets have been received. For each received test packet, lost or misdirected packet drill down function 124 may mark the corresponding entry in memory to indicate that the test packet has been received. Lost or misdirected packet drill down function 124 may maintain a timer for each entry. If the timer expires before a transmitted test packet is received, the packet may be identified as a lost packet. In an alternate implementation, lost or misdirected packet drill down function 124 may detect lost packets without using timers. For example, lost or misdirected drill down function 124 may identify lost packets using sequence number errors. If the sequence number in a given received packet or in an acknowledgement of a transmitted packet is not equal to the next expected sequence number, a lost packet may be indicated. Lost packets may be presented to the user by a capture interface on admin terminal 120, which will be described in more detail below.

Figure 2:
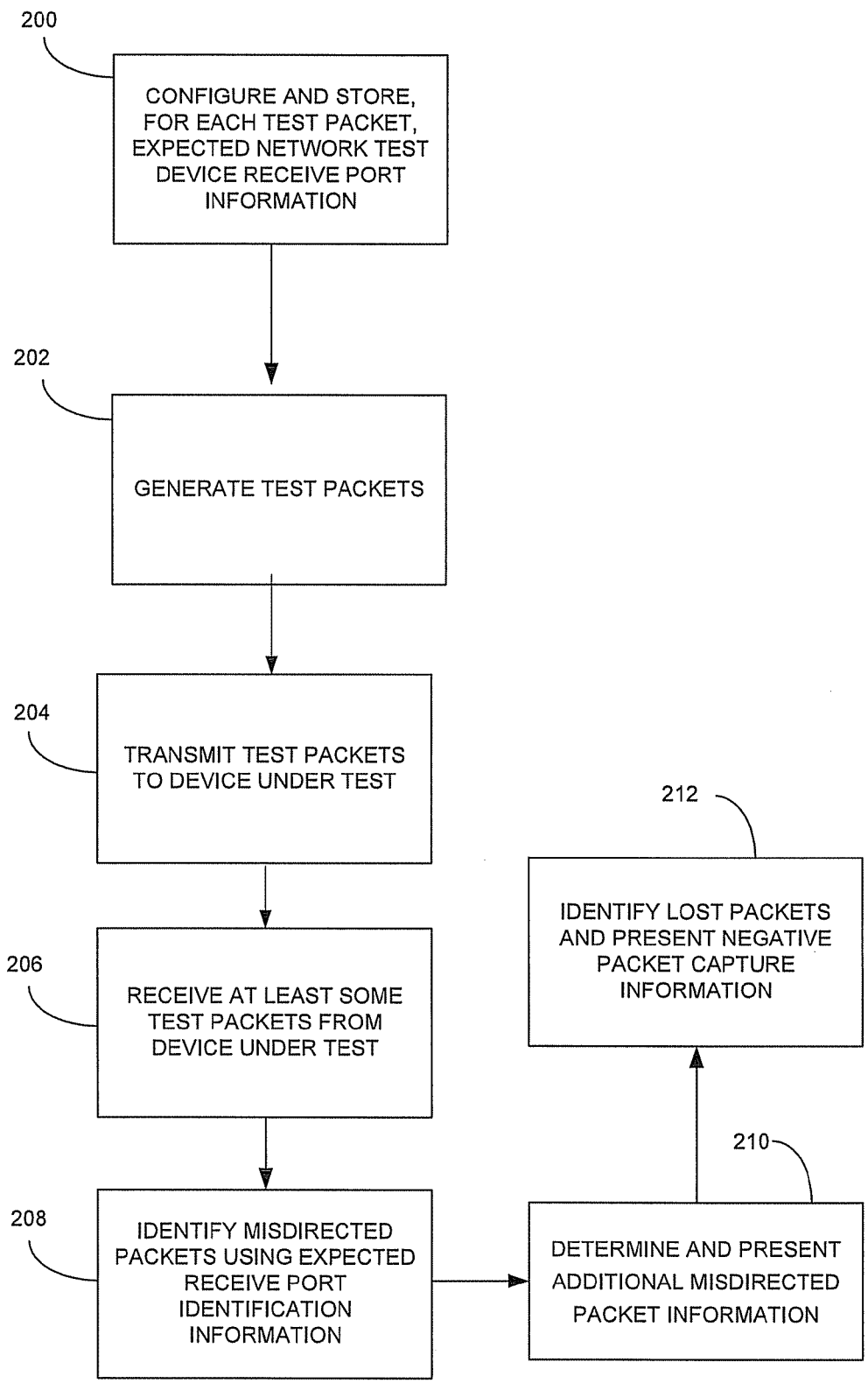
FIG. 2 is a flow chart illustrating an exemplary process for misdirected packet drill down and negative packet capture at a device under test according to an embodiment of the subject matter described herein.

FIG. 2 is a flow chart illustrating an exemplary process for misdirected packet drill down and negative packet capture at a device under test according to an embodiment of the subject matter described herein. Referring to FIG. 2, in step 200, expected test device receive port information is configured and stored for each of the test packets that are to be transmitted to the device under test. For example, expected receive port configuration function 122 may allow the user to configure ranges of PGID values for each port and also the PGID values to insert in each packet.

In step 202, test packets are generated. The test packets may have different sized payloads to test the functionality of device under test 102 in processing packets of different sizes. In another example, the test packets may carry payloads of different applications to see how device under test 102 responds to packets for different applications. In step 204, the test packets are transmitted to the device under test. In one example, network test device 100 may transmit the test packets to device under test 102 at line rate to stress test device under test 102.

In step 206, at least some of the transmitted packets are received from the device under test. The packets may be received on various ports 106, depending on how device under test 102 is configured. Some of the transmitted packets may be lost or misdirected based on misconfiguration, defects, or poor performance of device under test 102.

In step 208, the expected receive port identification information is used to identify misdirected packets. As described above, the PGID value in each received packet may be compared with the PGID values associated with the port on which the packet is received. If the PGID value in the packet is within the range of PGID values for the port on which the packet is received, the packet may be identified as a correctly received packet. If the PGID value in the packet is out of range for the port on which the packet is received, the packet may be identified as misdirected.

In step 210, additional information regarding misdirected packets is determined and presented to the user. In one example, the additional information determined for each misdirected packet may include the port on which the packet was actually received and the port on which the misdirected packet should have been received. To determine the port on which a misdirected packet should have been received, the PGID value in the packet may be compared against the PGID values of the remaining ports of network test device 100. If the PGID value matches one of the ranges of PGID values for the remaining ports, that port may be identified as the port on which the misdirected packet should have been received. The information associated with the port on which the packet should have been received and the port on which the packet is received may be presented to the user.

FIG. 3 is a diagram illustrating exemplary misdirected packet information that may be presented by lost or misdirected packet drill down function to the user. Referring to FIG. 3, for each misdirected packet, the information that may be displayed includes the source IP address, the destination IP address, the expected receive port and the actual receive port. Additional information that may be displayed includes the protocol carried by the packet and the time stamp. Information such as that illustrated in FIG. 3 provides a visual indication to the test system administrator of what should have happened during a test and what actually happened. For example, if all misdirected packets expected to be received on port 1 are actually received on port 2 of network test device 100, the cause may be a misconfiguration of the device under test or of the connection between network test device 100 and device under test 102.

Returning to FIG. 2, in step 212, lost packets are identified and negative packet capture information is displayed for the lost packets. As stated above, lost or misdirected packet drill down function 124 may identify lost packets by maintaining an entry in a data structure stored in memory for each packet transmitted to the device under test, marking or deleting entries for transmitted packets that are received from the device under test, and identifying packets that are not received within a time period as lost packets. For packets identified as lost, rather than displaying packet capture information that contains all packets that are correctly received by network test device 100, lost or misdirected packet drill down function 124 may display negative packet capture information that includes only information that is associated with lost packets.

FIG. 4 is a diagram illustrating exemplary negative packet capture information that may be displayed. Referring to FIG. 4, for each packet, a transmit time, a source IP address, a destination IP address, protocol, protocol information, and expected receive port information are displayed for each lost packet. The information illustrated in FIG. 4 can be contrasted with a standard packet capture interface where the same information for thousands of correctly received packets is displayed. There is no display of lost packets in a standard packet capture interface. Accordingly, the user is required to infer from the transmitted packets and the packet capture display which packets are lost. Displaying only the negative capture data as illustrated in FIG. 4 eliminates the need for the user to view correctly received packet information and infer lost packet information. Such a missing "needle in the haystack" problem would be nearly impossible to solve using a standard packet capture interface.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for misdirected packet drill down and negative packet capture at a network test device, the method comprising:
at network test device:
receiving and storing in the network test device, expected receive port information for a plurality of test packets;
generating the test packets;
transmitting the test packets to a device under test;
receiving at least some of the test packets from the device under test;
using the expected receive port information and the received test packets to identify misdirected test packets; and
for each of the packets identified as misdirected, determining a port of the network test device at which the packet should have been received and outputting an indication of the port of the network test device at which the packet should have been received, wherein determining a port of the network test device at which the packet should have been received includes comparing an identifier value in the packet with identifier values of ports of the network test device other than a port on which the packet was received.

2. The method of claim 1 wherein generating the test packets includes inserting the expected receive port information in the test packets and wherein using the expected receive port information to detect lost or misdirected test packets includes, for each received test packet, comparing the expected receive port in the test packet to information associated with the port on which the packet was received to determine whether or not the packet was misdirected by the device under test.

3. The method of claim 1 comprising storing information regarding the transmitted packets in memory of the network test device and using the information regarding the transmitted packets to identify lost packets.

4. The method of claim 3 wherein using the information regarding the transmitted packets to identify lost packets includes maintaining a timer for each transmitted packet.

5. The method of claim 3 wherein using the information regarding the transmitted packets to identify lost packets includes using transmitted packet sequence numbers to identify lost packets.

6. The method of claim 3 comprising displaying negative packet capture information for the transmitted test packets identified as lost.

7. The method of claim 6 wherein the negative packet capture information includes only information for the transmitted test packets identified as lost without displaying information for received test packets.

8. The method of claim 6 wherein the negative packet capture information includes an expected received port for each of the transmitted test packets identified as lost.

9. The method of claim 1 wherein generating the test packets includes generating the test packets at line rate to stress test the device under test.

10. The method of claim 1 wherein generating the test packets includes varying the payload sizes of the test packets.

11. The method of claim 1 wherein the device under test comprises a router, a switch, a firewall, or a network address translator.

12. The method of claim 1 wherein the identifier values comprise packet group identifier (PGID) values, wherein each port of the network test device corresponds to a range of PGID values and wherein comparing the identifier value in the packet with the identifier values of the ports other than the port on which the packet was received includes comparing the PGID value in the packet with the ranges of PGID values of the ports of the network test device of the network test device other than the port on which the packet was received.

13. A system for lost or misdirected packet drill down and negative packet capture at a network test device, the system comprising:
a network test device including:
an expected test device receive port configuration function configured to receive and store, for each of a plurality of test packets, expected test device receive port information;
a test packet generator configured to generate the test packets;
a plurality of ports configured to transmit the test packets to a device under test and configured to receive at least some of the test packets from the devise under test;
a packet receiver associated with each of the ports configured to use the expected receive port identification information to identify misdirected packets; and
a lost or misdirected packet drill down function configured to, for each of the packets identified as misdirected, determine a port of the network test device at which the packet should have been received and output an indication of the port of the network test device at which the packet should have been received, wherein determining a port of the network test device at which the packet should have been received includes comparing an identifier value in the packet with identifier values of ports of the network test device other than a port on which the packet was received.

14. The system of claim 13 wherein test packet generator is configured to insert the expected receive port information in the test packets and wherein the lost or misdirected packet drill down function is configured to, for each received test packet, compare the expected receive port information in the test packet to information associated with the port on which the packet was received to determine whether or not the packet was misdirected by the device under test.

15. The system of claim 13 wherein the lost or misdirected packet drill down function is configured to use stored information regarding the transmitted test packets to identify transmitted test packets as lost.

16. The system of claim 15 wherein the lost or misdirected drill down function is configured to use timers associated with the transmitted test packets to identify lost packets.

17. The system of claim 15 wherein the lost or misdirected drill down function is configured to use sequence numbers associated with the transmitted packets to identify lost packets.

18. The system of claim 15 wherein the lost or misdirected packet drill down function is configured to display negative packet capture information transmitted test packets identified as lost.

19. The system of claim 18 wherein the negative packet capture information includes only information for the transmitted test packets identified as lost without displaying information for correctly received test packets.

20. The system of claim 18 wherein the negative packet capture information includes an expected received port for each of the transmitted test packets identified as lost.

21. The system of claim 13 wherein the test packet generator is configured to generate the test packets to the device under test at line rate to stress test the device under test.

22. The system of claim 13 wherein the test packet generator is configured to vary payload sizes of the test packets.

23. The system of claim 13 wherein the device under test comprises a router, a switch, a firewall, or a network address translator.

24. The system of claim 13 wherein the identifier values comprise packet group identifier (PGID) values, wherein each port of the network test device corresponds to a range of PGID values and wherein comparing the identifier value in the packet with the identifier values of the ports other than the port on which the packet was received includes comparing the PGID value in the packet with the ranges of PGID values of the ports of the network test device of the network test device other than the port on which the packet was received.

25. A non-transitory computer readable medium having stored thereon executable instructions that when executed by the processor of a computer controls the computer to perform steps comprising:
at network test device:
generating test packets;
for each test packet, receiving and storing in the network test device, expected test device receive port information;
transmitting the test packets to a device under test;
receiving at least some of the test packets from the device under test; and
using the expected receive port information and the received test packets to identify lost or misdirected test packets; and
for each of the packets identified as misdirected, determining a port of the network test device at which the packet should have been received and outputting an indication of the port of the network test device at which the packet should have been received, wherein determining a port of the network test device at which the packet should have been received includes comparing an identifier value in the packet with identifier values of ports of the network test device other than a port on which the packet was received.

26. The non-transitory computer readable medium of claim 25 wherein the identifier values comprise packet group identifier (PGID) values, wherein each port of the network test device corresponds to a range of PGID values and wherein comparing the identifier value in the packet with the identifier values of the ports other than the port on which the packet was received includes comparing the PGID value in the packet with the ranges of PGID values of the ports of the network test device of the network test device other than the port on which the packet was received.

* * * * *